United States Patent [19]

Nobles

[11] Patent Number: 4,715,566
[45] Date of Patent: Dec. 29, 1987

[54] INTERCONNECTABLE SPACE STATION MODULE AND SPACE STATION FORMED THEREWITH

[75] Inventor: William O. Nobles, Littleton, Colo.

[73] Assignee: Martin Marietta Corporation, Bethesda, Md.

[21] Appl. No.: 792,387

[22] Filed: Oct. 29, 1985

[51] Int. Cl.$^4$ ............................................. B64G 1/10
[52] U.S. Cl. ............................. 244/159; 52/DIG. 10; 52/81; 403/471
[58] Field of Search ........................ 244/158 R, 159; 52/DIG. 10, 81, 236.1, 79.4, 648; 403/171, 172, 217

[56] References Cited

U.S. PATENT DOCUMENTS 3,093,461 6/1963 Woolven ...................... 52/DIG. 10
3,332,640 7/1967 Nesheim ............................. 244/159

FOREIGN PATENT DOCUMENTS 410185 3/1945 Italy ..................................... 403/171

OTHER PUBLICATIONS

Taylor & Assoc., "Space Station Architectural Elements and Issue Definition Study", Sep. 25, 1984.

Primary Examiner—Galen L. Barefoot
Attorney, Agent, or Firm—Sughrue, Mion, Zinn, Macpeak & Seas

[57] ABSTRACT

A plurality of manned space station modules are interconnected via end caps into a variety of space station configurations without need for dedicated interconnect modules. Each module preferably comprises an elongated module body, end caps mounted to respective ends of the body and the end caps being in the form of a four sided, truncated pyramid having a truncated side forming a flat, square central end face remote from the body and at right angles to the longitudinal axis of the body, and four flat oblique side faces integral with and about the four sides of the central end face. The body may be cylindrical in form or of cruciform configuration defined by paired right angle intersecting panels. Three modules may be interconnected at their ends to form a triad. Modules may be connected end-to-end by abutting end faces of the end caps, side-face-to-side-face or end-face-to-side-face. The modules may have their axes coplanar, or out of plane, as required.

10 Claims, 9 Drawing Figures

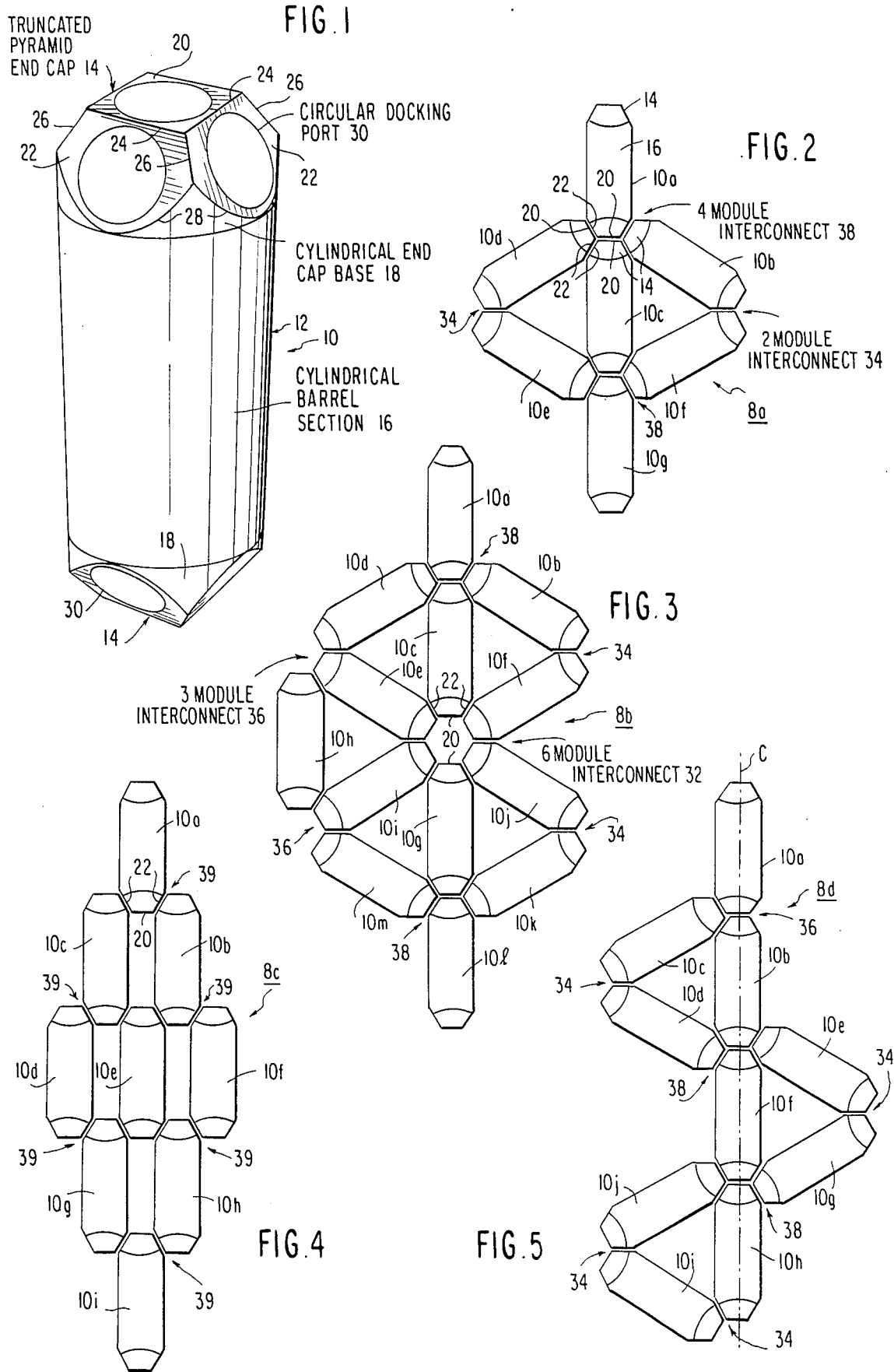

INTERCONNECTABLE SPACE STATION MODULE AND SPACE STATION FORMED THEREWITH

FIELD OF THE INVENTION

This invention relates to manned orbiting space stations, and more particularly to improved interconnectable modules capable of forming such space stations in a vast variety of configurations.

BACKGROUND OF THE INVENTION

Orbiting space stations have progressed in two stages. Initially, orbiting space stations were designed so that they could be placed in orbit in unitary form and sent aloft in one space shot and expanded or otherwise modified during deployment into operational configuration. These space stations were generally toroidal in form. U.S. Pat. Nos. 3,144,219, 3,169,725, and 3,332,640 are exemplary of that earlier approach.

U.S. Pat. No. 3,169,725 involves a high hybrid inflatable body/rigid body construction with rigid cylindrical sections joined by flexible connectors with the sections connected to a central hub and erectable to form a rigid, hexagonal, tubular ring thereabout, upon reaching the desired orbit.

U.S. Pat. No. 3,326,640 involves a partly preconnected structure utilizing cylindrical sections which are hinged to each other such that upon reaching space, the segments which are clustered closely about the rocket carrier on launching, may be extended and joined together to form a toroidal structure.

With the advent of the Space Transportation System Shuttle Launch Vehicle (STS), the sections or components of the station are transported into orbit in incremental stages constrained by the cargo bay configuration and weight limitations associated with the STS shuttle. Under such conditions, the incremental parts of the station are then assembled in space into a functional space station assembly. Attempts have been made to create an acceptable space vehicle module to be joined in space at a predetermined earth orbit by a number of other space vehicle modules and to be connected together to form a pressure tight space station which is sufficiently large and provisioned to support a research or construction crew for extended periods of time.

U.S. Pat. No. 4,057,207 is directed to such a concept which is based on an earlier U.S. Pat. No. 3,953,948 permitting the resulting space station structure to conform to selected shapes possible in homohedral geometry; namely, two types of rings and four varieties of helicies. Structurally, each model consists of at least two joined, truncated icosahedra, the truncations occurring where up to three pentangular pyramids about nonadjacent vertices have been removed from each icosahedra; the connection occurring between two truncation surfaces, one from each icosahedra. In the system, the end truncation surfaces have alignment and docking means so that they can be brought to rigid physical contact with other similar truncation surfaces on other modules in up to five difference positions.

The use of an icosahedra as the geometric basis limits the structural faces of the modules to being all flat plates which limits the modules to a strong, heavy structure to resist the internal pressurization required of the station and requires six configurations to build a completed structure. Obviously, this design is hardly weight efficient which is a primary criteria. Further, the configuration of the icosahedra is neither effectively nor efficiently matched to the cargo bay configuration of the STS shuttle. While docking ports are provided within one or more of the flat faces of the icosahedra module, the system requires another specialized module for access to the station interior. The modules fail to include provision for load paths to accommodate launch loads. Not only is the icosahedra concept complicated, but internal access with the space station structure is constrained by the relatively small size of the icosahedra units and the interior structural beams required in their manufacture. The concept of U.S. Pat. No, 4,057,207 does not permit easy accommodation of modules which are to be isolated from the general atmospheric circulation system of the station, makes no provision for accommodating elements such as air locks and the associated hyperbaric chambers and hangar areas for operational equipment such as manned maneuvering units, and makes no provision for accommodating logistics modules into the space station structure.

It is, therefore, one object of the present invention to provide an improved, interconnectable space station module which is of simplified construction, has high strength to weight ratio, is of cylindrical body form, purposely sized and configured to fit within the cargo bay of a STS orbiter, which can be interconnected into a variety of patterns without need for dedicated interconnect modules, and which has access ports to the individual modules which are always available for use as EVA air locks, logistics modules docking, etc.

SUMMARY OF THE INVENTION

The invention, in part, is directed to a manned space station module which can be interconnected into a variety of patterns without need for dedicated interconnect modules, has high strength to weight ratio, and which, when the module is assembled into space station form, provides access ports which are always available for accommodating, on a temporary or extended length basis, associated equipment or hyperbaric chamber modules. The module comprises:

an elongated module body, end caps mounted to respective ends of the elongated body, the end caps being in the form of a four sided truncated pyramid having a truncated side forming a flat, square, central end face and four flat oblique side faces integral therewith and about the four sides of the central end face.

The elongated module body may be of elongated cylindrical form or the elongated module body may constitute a cruciform truss. Further, the side faces of the four sided, truncated pyramid of each end cap may be 30° to the axis of the module body.

BRIEF DESCRIPTION OF THE DRAWINGS

FIG. 1 is a perspective view of a basic interconnectable manned space station module forming a preferred embodiment of the present invention.

FIG. 2 is a plan view of a manned space station module utilizing a four module interconnect between a series of uniformly sized modules identical to that of FIG. 1.

FIG. 3 is a plan view of a manned space station utilizing tow, three, four and six module interconnects.

FIG. 4 is a plan view of a manned space station utilizing a series of modules identical to that of FIG. 1, in parallel aligned interconnect form.

FIG. 5 is a plan view of a manned space station using four module interconnects with alternating triads.

DESCRIPTION OF THE PREFERRED EMBODIMENTS

Figure 6:
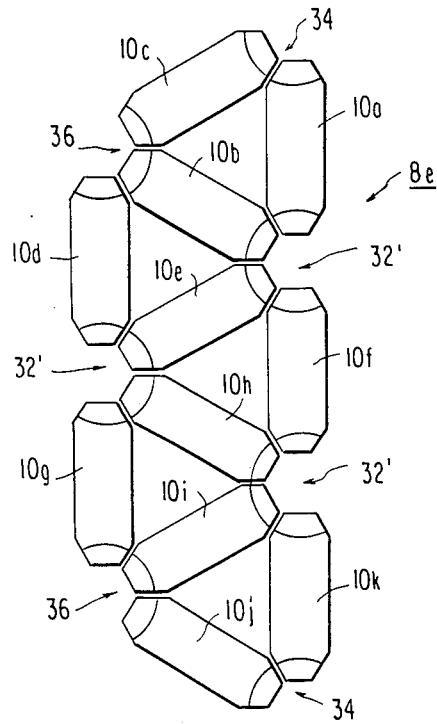
FIG. 6 is a plan view of a space station employing a triad series with partially filled six module interconnects using a plurality of the modules of the form illustrated in FIG. 1.

The present invention is directed principally to the creation of an improved interconnectable manned space station module to facilitate the interconnection of a plurality of such modules to make up a manned space station.

Reference to FIG. 1 shows an embodiment of one such module, indicated generally at 10. The modules, such as module 10, are required to fit within the cargo bay of the STS orbiter. Module 10 is generally cylindrical in shape, of approximately 14' in diameter and from 20' to 40' in length. Once in orbit, a series of modules 10 are assembled and interconnected at their ends to build up the manned space station.

The principal unique feature of the invention is the configuration provided to paired end caps, indicated generally at 14, which are fixed to the ends of a 14' diameter cylindrical barrel section 16. In the past, end caps were employed for modules taking the form of domed plates with a docking port in the center. The concept of the present invention replaces the domed end plates with a four sided pyramid with a truncated top. End caps 14 are each composed of a cylindrical end cap base as at 18 and five faces of a truncated pyramid. In that respect, the end cap 14 is provided with a square, central, flat, truncated end face 20 which is the same dimension across as is the slant height of the four pyramid side faces 22. This geometry results in five flat surfaces on each end cap 14. Each of these surfaces 20, 22 can accommodate a circular port as at 30 for interconnecting with other modules or for attaching other external structures such as servicing platforms. The flat side faces 22 join the central square truncated end face integrally at edges 24 of end face 20. Further, lateral edges 26 of side face 22 join the side faces 22 together and extend from the corners of end face 20 in the direction of the cylindrical barrel section 16 of the module 10. Side faces 22 merge into cylindrical base 18 along proximal edges 28 thereof.

The use of the end caps or end cap fixtures 14 for the modules 10 permits a variety of interconnecting configurations to be achieved between modules without requiring the use of extra, dedicated interconnecting modules or tunnels. A variety of interconnecting configurations forming space stations are illustrated in FIGS. 2-7 inclusive.

FIG. 2 illustrates a manned space station 8a of such configuration that four modules 10 interconnect into a common intersection at two interconnect locations. The modules are given designations 10a, 10b, 10c, 10d, 10e, 10f and 10g, and the seven modules are arranged such that with the two intersections, the modules form closed triangles. Modules 10a, 10c, for instance, are connected end to end with access between the interior of the modules being achieved through ports 30 (not shown) borne by end faces 20 of respective modules 10a, 10c. Access from module 10a may also be had via ports, as at 30, FIG. 1, within side faces 22 of that module and end faces 20 for modules 10d, 10b to the left and right, respectively. Access may be had between the central in line module 10c and oblique modules 10d, 10b, to the left and right thereof, through cooperating circular ports 30 (not shown) within side faces 22 of the end caps of respective modules 10d, 10c, and 10b. In addition to dual four module interconnects 38, there are formed a pair of two module interconnects 34. It is not believed necessary to discuss with respect to the FIGS. 2-7 inclusive, the specific manner of access and interconnection facewise for the end caps of the modules achieving the interconnections.

Turning to FIG. 3, this figure illustrates the combination of the two four module interconnects 38 of FIG. 2 with a further six module interconnect 32 at the center of a space station, indicated generally at 8b. In space station 8b, while the basic assembly of the upper four module interconnect remains intact, module 10d is separated axially from axially aligned, end abutting modules 10a, 10c and the station adds additional modules at 10h through 10m, respectively. Modules 10c, 10f, 10j, 10g, 10i and 10e are joined together to form a six module interconnect 32 via respective end cap side faces 22 of these modules. The six module interconnect 32 is partially formed by modules which, in turn, define two module interconnects 34 for modules 10b, 10f, and 10j, 10k, respectively. Additionally, to the opposite side, there are two or three module interconnects 36, formed by modules 10d, 10e, and 10h, and 10h, 10i, 10m, respectively. The station 8b is completed by two, four module interconnects 38.

In the six module interconnect 32 of FIG. 3, it should be noted that there is no direct communication between any of the end faces 20 for the six modules making up the six module interconnect 32.

FIG. 4 illustrates a manned space station 8c in which the modules are arranged in the formation of parallel interconnects 39 of three modules at each joint. Modules 10a through 10i inclusive are joined solely by way of their side faces 22, and none of the end faces 20 of the end caps are connected to each other, or to side faces of adjacent modules.

FIG. 5 shows a manned space station 8d characterized by two four module interconnects 38, with modules 10a through 10b inclusive forming triangle arrays or triads on alternate sides of the major axis C formed by a two module interconnect 34 and leading to a three module interconnect 36 at the top and a further two module interconnect 34 at the bottom of the station, as seen in the figure. The connections between respective faces of end caps for the modules 10a through 10j are achieved in similar fashion to the stations previously discussed in FIGS. 2-4 inclusive.

FIG. 6 illustrates another space station 8e of a continuing and repeated form or pattern made up of triangular, three module sets or triads connected by partially completed or partially filled six module interconnects 32', respectively. Further, others of the modules 10a through 10k inclusive form three module interconnects 36 and two module interconnects 34, at the extreme top and bottom respectively, of the manned space station 8e. The configuration may be described, alternatively as a triad series station with partially filled six module interconnects.

Figure 7:
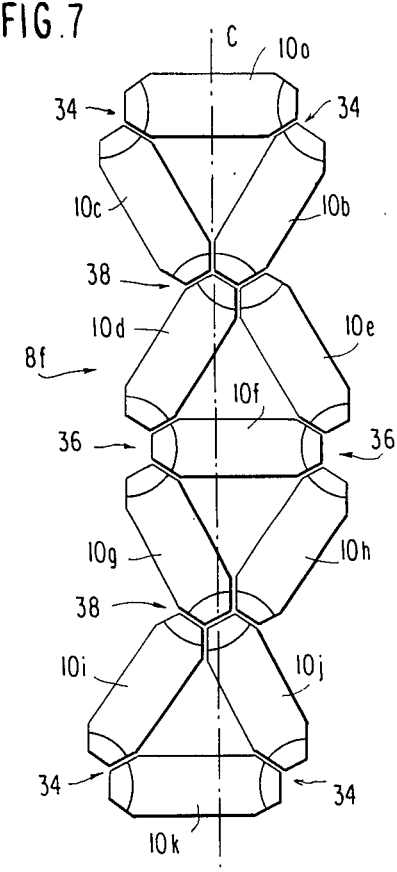
FIG. 7 is a plan view of a triad series space station with four module interconnects formed by a plurality of modules as exemplified by FIG. 1.

FIG. 7 shows a station 8f defined by triad series of modules 10a through 10k inclusive with a number of four module interconnects 38. In this case, the modules 10a through 10k inclusive form a triad series or triangular sets of modules integrated by way of two four module interconnects 38, two three module interconnects 36 at the center of the array, and a number of two module interconnects 36 at the top and bottom thereof. Note the lateral offsetting of the triads relative to the longitudinal axis or center line C of the station 8f.

It should be appreciated that all of the manned space stations of FIGS. 2–7 inclusive have modules which lie in a common plane. However, with the pyramidal end caps 14 also having side 22 faces oriented out of the plane defined by the axes of respective modules 10, space stations may take forms or patterns which can be extended in three dimensions.

For space station applications, inertial considerations dictate that the major distribution of the mass must be kept in the orbit plane. This also tells one that this concept requires all the basic station modules as generally indicated at 10, FIG. 1, to be of a standard length such that the modules will interconnect into equilateral triangles forming triads. However, there are still worthwhile applications for out of plane ports to attach a variety of modules which are not required to be in the orbit plane, and for which an end cap is needed on only one end. Examples are:

(1) The logistic module (s). This module may be easily replaceable, and located in proximity to the habitation modules such as 10a through 10k, FIG. 7. At the end of a given resupply (90 day), a fresh logistics module would be brought and inserted in the diametrically opposite port to the exhausted logistics module which would then be removed for return to earth. This would preserve the same relationship of the replacement logistics module to the habitation area module.

(2) Environmental control and life support (ECLS) module(s). These modules contain equipment which will, in all likelihood, need frequent ground refurbishment and update as new technologies become available. This consideration, along with the requirement to have these modules evenly distributed about the station, makes the ECLS module a good candidate for the single ended out-of-plane port locations.

(3) Air lock module(s). For extra vehicular activity-egress from the station along with a sheltered hanger area for stowage of manned maneuvering units could be very efficiently located in such an out-of-plane port. This would allow the high pressure (3 to 5 atmoshperes) hyperbaric chamber to be accommodated in the air lock without causing major impact on the design requirements for the major modules.

(4) Specialized laboratory module(s). Any laboratories which require isolation for the general atmospheric circulation of the station could be a candidate for the out-of-plane ports.

The invention envisions as an additional feature, the incorporation into the end caps 14 of trunion pins (not shown) which provides the load path interface with the STS orbiter cargo bay. These trunion pins must support the loaded module during the launch environment. The internal truss structure necessary for the end cap may be designed to also provide these load paths.

It should be noted that while each of the five flat faces 20, 22 on end cap 14 can accommodate an interconnect docking port 30, there is no requirement that each face 20, 22 be so equipped. Only those faces which are planned to be used need to be outfitted with a docking port prior to transport to the manned space station locale. Further, such blank face could be retrofitted with a port on orbit if a change in plan called for a port where none had been installed.

Figure 8:
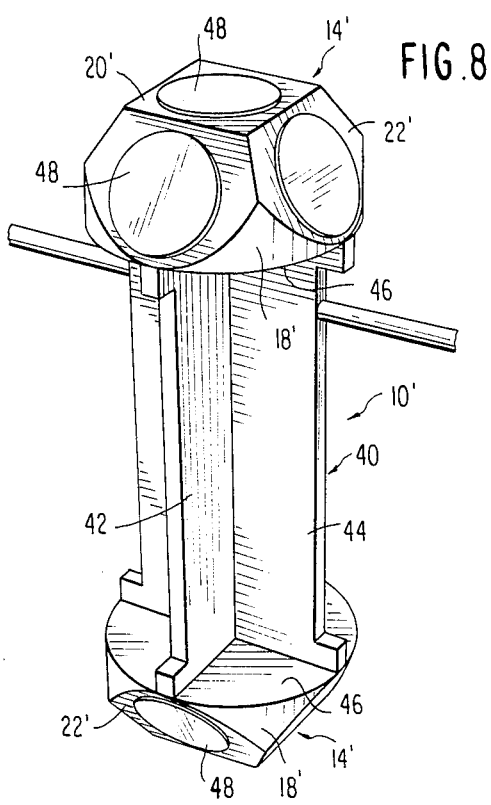
FIG. 8 is a perspective view of an alternate cruciform truss module which may be employed in forming any one of the assemblies of FIGS. 2-7 inclusive, in lieu of a module illustrated therein.

By reference to FIG. 8, there is shown one form of unpressurized module, indicated generally at 10', which utilizes essentially identical end caps 14' which may be solid, or at least totally enclosed, if hollow. Respective end caps 14' are joined by mechanical attachment to the ends of a cruciform truss, indicated generally at 40, formed of two right angle, intersecting elongated rectangular panels 42, 44 fixed, at their ends, to circular end faces 46 of respective end caps 14'. Additionally, the end caps 18' each include a flat end face 20' and oblique angled side faces 22' which side faces 22' merge into or integrate with cylindrical base 18' of the respective end caps. Thin circular projections as at 48 on these faces, facilitate docking with other modules. The modules 10' may be employed for attaching subsystem modules.

Attachment of servicing structures and fuel depots may be in general accomplished by attaching on the standard end caps 18 to the structure and locating it at one of the outboard facing ports in the orbit plane and in one of the out-of-plane ports of a given module forming the station. If EVA operations are required, it would be possible to incorporate an EVA air lock along with the end cap to facilitate access to the servicing structure.

If robotic servicing mechanisms are utilized, it would be possible to incorporate the pressurized control station inside a dedicated portion of the servicing module. Docking of the space shuttle orbiter would utilize one of the outward facing ports in the orbit plane.

Figure 9:
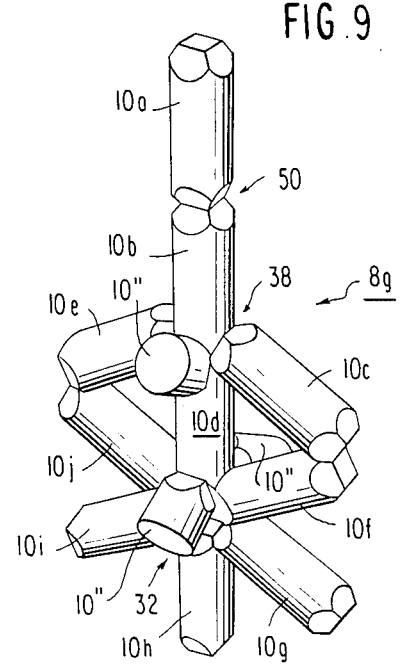
FIG. 9 is an isometric showing of a four and six module interconnect manned space station in accordance with the present invention with single ended modules attached at out of plane ports.

FIG. 9 is an isometric drawing of a manned space station indicated generally at 8g, which starting from the top, utilizes an in line series interconnect 50, followed by a four module interconnect 30, followed by a six module interconnect 32. Single end modules 10" are shown attached to the out-of-plane side face ports 30 at both types of interconnects as, for instance, at 32 and 39. The space station 8g other than the single end modules 10" is formed by a series of modules 10a through 10i inclusive as shown which are identical to the basic module 10 in FIG. 1. Modules 10' are respectively angled up or down in terms of their inclination relative to the axis of symmetry of the assembly and, of course, dependent upon the connection between an end face thereof of the singular end cap thereof, and the side faces of the module 10d. The single end service modules 10" are attached to out-of-plane ports 30 of the in line series module 10d, from which they project.

As may be appreciated, the concept provides an improved manned space station module concept and stations formed thereof for effectively interconnecting a number of modules of similar or identical form to make up a manned space station. The improvement consists principally in the design of the end caps attached to elongated cylindrical module bodies, with the end caps consisting of preferably separately constructed structures attached to the respective ends of a cylindrical barrel section. Each consists of a truncated four sided pyramid shape, emanating from an end cap base which base is directly attached to the end of the barrel section. In the illustrated embodiment, the side faces of the pyramid form an angle of 30° with the side of the cylindrical barrel section. Not only does the configuration permit the module to be interconnected into a variety of patterns or station configurations, but the patterns are structurally rigid and provide closed "race track" circuits with only three modules defining a triad. The concept may be employed to attach payload modules to a platform space craft bus in the same manner as the station modules of the drawings. Using a four sided truncated pyramid to give a fifth flat side perpendicular to the axis of the module for each end cap provides a highly effective but simplified connection concept at both ends of the cylindrical module barrel section or body. The cylindrical barrel section is extremely weight efficient, maximizing the strength of the pressure vessel when employed in that form, and may be efficiently matched to the cargo bay configuration of the shuttle. The invention employs end caps which provide inherent access through the outer faces thereof and access to the interior at any desired point through respective out-of-plane faces. The concept leaves a significantly large internal volume of the cylindrical module clear for unimpeded access and for installation of desired outfitting. The configuration and formation of the end caps applied to the ends of the cylindrical barrel section permits ready accommodation of elements such as air locks and associated hyperbaric chambers and hangar areas for operational equipment with the elements easily accommodated in a flexible way by locating them at the out-of-plane ports most convenient to the area where they stand required. Logistic modules may be connected and readily interchanged at the logistic resupply intervals without major perturbation at the station structure.

While the invention has been particularly shown and described with reference to preferred embodiments thereof, it will be understood by those skilled in the art that the foregoing and other changes in forms and details may be made therein without departing from the spirit and scope of the invention.

What is claimed is:

1. An interconnectable manned space station module for interconnection into a variety of space station configurations without need for dedicated interconnect modules, which is lightweight, strong and stiff and which provides readily available access ports for both inplane connection and offplane docking of service modules and the like thereto, said module comprising:
   an elongated module body,
   end caps mounted to respective ends of said body,
   said end caps being in the form of a four sided truncated pyramid having a truncated side forming a flat, square central end face remote from said body and at right angles to the longitudinal axis of said body, and four flat oblique side faces integral with and about the four sides of the central end face.

2. The module as claimed in claim 1, wherein said module body is cylindrical in form, and said end cap includes a base portion of cylindrical form sized to that of the cylindrical body and directly connected thereto and merging into said four flat oblique side faces.

3. The module as claimed in claim 1, wherein said elongated module body is of cruciform configuration defined by paired right angle intersecting panels having opposite ends joined directly to said end caps.

4. The module as claimed in claim 1, wherein circular access ports are provided within the flat square central end faces of both end caps, and wherein at least one of said oblique side faces of at least one of said end caps further includes circular access ports therewithin.

5. In a manned space station comprising interconnected manned space station modules, the improvement wherein said modules comprise interconnectable manned space station modules for interconnection into a variety of space station configurations without need for dedicated interconnect modules, wherein each module comprises an elongated module body, end caps mounted to respective ends of side body, said end caps being in the form of a four sided truncated pyramid having a truncated side forming a flat, square central end face remote from said body and at right angles to the longitudinal axis of said body, and four flat oblique side faces integral with and about the four sides of the central end face, and wherein an elongated module body end cap of each module is in one of end-face-to-end-face, end-face-to-side-face, or side-face-to-side-face abutting engagement with at least one other of said modules, with the longitudinal axes of said modules coplanar.

6. The space station as claimed in claim 5, wherein said station is formed of said modules numbering at least seven including three end-to-end, axially aligned modules having end faces of respective modules in interconnecting abutment, and wherein two pairs of other of said modules form with respective pairs of said three end-to-end axially aligned end face abutting modules two four module interconnects with the end faces of two of said other modules of each pair abutting side faces of one of said three end-to-end axially aligned modules and side faces thereof abutting adjacent side faces of another of said end-to-end axially aligned end face abutting modules, to opposite sides thereof, and wherein all of said pairs of modules have their axes coplanar and oppositely oblique such that side faces of said other modules remote from said four module interconnect of respective pairs are in side face abutment, to form triangle module arrays with the middle module of said three end-to-end axially aligned end face abutting modules, and on opposite sides thereof.

7. The space station as claimed in claim 5, further comprising at least one out of plane interconnect module comprising an elongated module body, an end cap mounted to at least one end of said elongated module body, said end cap being in the form of a four sided, truncated pyramid having a truncated side forming a flat, square central end face remote from said body and at right angles to the longitudinal axis of said body, and four flat oblique side faces integral with and about the four sides of the central end face, and wherein said at least one out of plane module has the end cap end face in connecting abutment with a side face of an end cap of one of said coplanar space station modules, and an oblique side face in connecting abutment with a correspondingly oblique side face of that coplanar space station module.

8. The space station as claimed in claim 5, wherein said space station modules comprise at least six coplanar modules, wherein said modules are interconnected at one end in a six module interconnect with the end faces of all six space station modules spaced from each other, with said six space station modules radiating radially outwardly in a star array with flat oblique side faces on opposite sides thereof abutting and interconnected with the oblique side faces of the immediately adjacent station modules to opposite sides thereof.

9. The manned space station as claimed in claim 5, wherein said modules are coplanar, the axes of the station modules are parallel, said modules are laterally spaced from each other, and wherein at least some of said coplanar modules are interconnected with other modules at opposite ends thereof, and wherein all of said interconnected coplanar modules are interconnected with each other in oblique side face abutment.

10. The manned space station as claimed in claim 9, wherein said station comprises three modules, said modules are coplanar and at 45° to each other defining a triangular end-to-end assembly with flat oblique side faces of respective modules at each apex of the triangular assembly being in interconnecting abutment to thereby form a triad.

* * * * *